(12) United States Patent  
Blaschke et al.

(10) Patent No.: US 11,146,642 B2  
(45) Date of Patent: Oct. 12, 2021

(54) WELL SITE COLLABORATION SYSTEM WITH SMART TECHNOLOGY

(71) Applicant: Halliburton Energy Services, Inc., Houston, TX (US)

(72) Inventors: Keith Edward Blaschke, Duncan, OK (US); Paul Lewis Mendenall, Duncan, OK (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 17/052,996

(22) PCT Filed: Nov. 28, 2018

(86) PCT No.: PCT/US2018/062734  
§ 371 (c)(1),  
(2) Date: Nov. 4, 2020

(87) PCT Pub. No.: WO2019/236130  
PCT Pub. Date: Dec. 12, 2019

(65) Prior Publication Data  
US 2021/0126975 A1    Apr. 29, 2021

Related U.S. Application Data

(60) Provisional application No. 62/682,408, filed on Jun. 8, 2018, provisional application No. 62/682,391, filed (Continued)

(51) Int. Cl.  
H04L 29/08    (2006.01)  
G06Q 50/02    (2012.01)  
(Continued)

(52) U.S. Cl.  
CPC ............ *H04L 67/125* (2013.01); *G06F 21/62* (2013.01); *G06Q 50/02* (2013.01); *H04L 63/08* (2013.01); *H04L 65/403* (2013.01); *H04L 67/38* (2013.01)

(58) Field of Classification Search  
CPC ..... H04L 67/125; H04L 67/38; H04L 65/403; H04L 63/08; G06F 21/62; G06Q 50/02  
(Continued)

(56) References Cited

U.S. PATENT DOCUMENTS 6,944,547 B2    9/2005  Womer et al.  
7,941,158 B2 *  5/2011  Olson ................... G06Q 50/02  
                                                                 455/456.1

(Continued)

FOREIGN PATENT DOCUMENTS

WO    2015/123045 A1    8/2015  
WO    WO-2015123045 A1 * 8/2015    ....... G06Q 10/06313  
(Continued)

OTHER PUBLICATIONS

International Search Report and Written Opinion issued in PCT Application No. PCT/US2018/062734 dated Mar. 14, 2019, 17 pages.

(Continued)

*Primary Examiner* — Frantz B Jean  
(74) *Attorney, Agent, or Firm* — John Wustenberg; Baker Botts L.L.P.

(57) ABSTRACT

To reduce As difficulties associated with sub-site collaboration in hydrocarbon recovery, exploration, operation, or services environments, on-site collaboration between users is provided by including a multi-location virtual collaboration and monitoring system that enables multi-location virtual collaboration, monitoring, and data sharing, between users at sub-sites In hydrocarbon recovery, exploration  
(Continued)

operation, or services environments. A user may access real-time and stored data using one or more wearable or portable devices. Further, a user may configure data provision and data provision preferences for consumption of data In a variety of formats.

20 Claims, 2 Drawing Sheets

Related U.S. Application Data on Jun. 8, 2018, provisional application No. 62/682,641, filed on Jun. 8, 2018, provisional application No. 62/682,358, filed on Jun. 8, 2018, provisional application No. 62/682,374, filed on Jun. 8, 2018.

(51) Int. Cl.
*H04L 29/06* (2006.01)
*G06F 21/62* (2013.01)

(58) Field of Classification Search
USPC .......................................................... 709/204
See application file for complete search history.

(56) References Cited

U.S. PATENT DOCUMENTS

| | | | |
|---|---|---|---|
| 2011/0272144 A1* | 11/2011 | Belcher | H04L 65/1026 166/250.01 |
| 2015/0019231 A1* | 1/2015 | Sadler | G16H 30/20 705/2 |
| 2016/0186531 A1 | 6/2016 | Harkless et al. | |
| 2017/0152729 A1 | 6/2017 | Gleitman et al. | |

FOREIGN PATENT DOCUMENTS

| | | |
|---|---|---|
| WO | 2016/130160 A1 | 8/2016 |
| WO | 2016/130161 A1 | 8/2016 |

OTHER PUBLICATIONS

International Preliminary Report on Patentability issued in related PCT Application No. PCT/US2018/062734 dated Dec. 17, 2020, 14 pages.

\* cited by examiner

WELL SITE COLLABORATION SYSTEM WITH SMART TECHNOLOGY

CROSS-REFERENCE TO RELATED APPLICATION

The present application is a U.S. National Stage Application of International Application No. PCT/US2018/062734 filed Nov. 28, 2018, which claimed benefit of U.S. Provisional Application Serial No. 62/682,408 filed on Jun. 8, 2018; U.S. Provisional Application Serial No. 62/682,391 filed on Jun. 8, 2018; U.S. Provisional Application Serial No. 62/682,641 filed on Jun. 8, 2018; U.S. Provisional Application Serial No. 62/682,358 filed on Jun. 8, 2018; and U.S. Provisional Application Serial No. 62/682,374 filed on Jun. 8, 2018, all of which are incorporated herein by reference in their entirety for all purposes.

TECHNICAL FIELD

The present disclosure relates generally to on-site collaboration at a hydrocarbon recovery, exploration, operation, or services environment and, more particularly, to multi-location virtual collaboration, monitoring, and data sharing, including user control of data sharing, between sub-sites in a hydrocarbon recovery, exploration, operation, or services environment.

BACKGROUND

One or more of service providers, operators, and customers may be located at sub-sites within an operations site, including both land and offshore drilling sites. A common issue at well sites relates to real-time communication, data sharing, and collaboration between the one or more of service providers, operators, and customers.

BRIEF DESCRIPTION OF THE DRAWINGS

For a more complete understanding of the present disclosure and its features and advantages, reference is now made to the following description, taken in conjunction with the accompanying drawings, in which.

Figure 1:
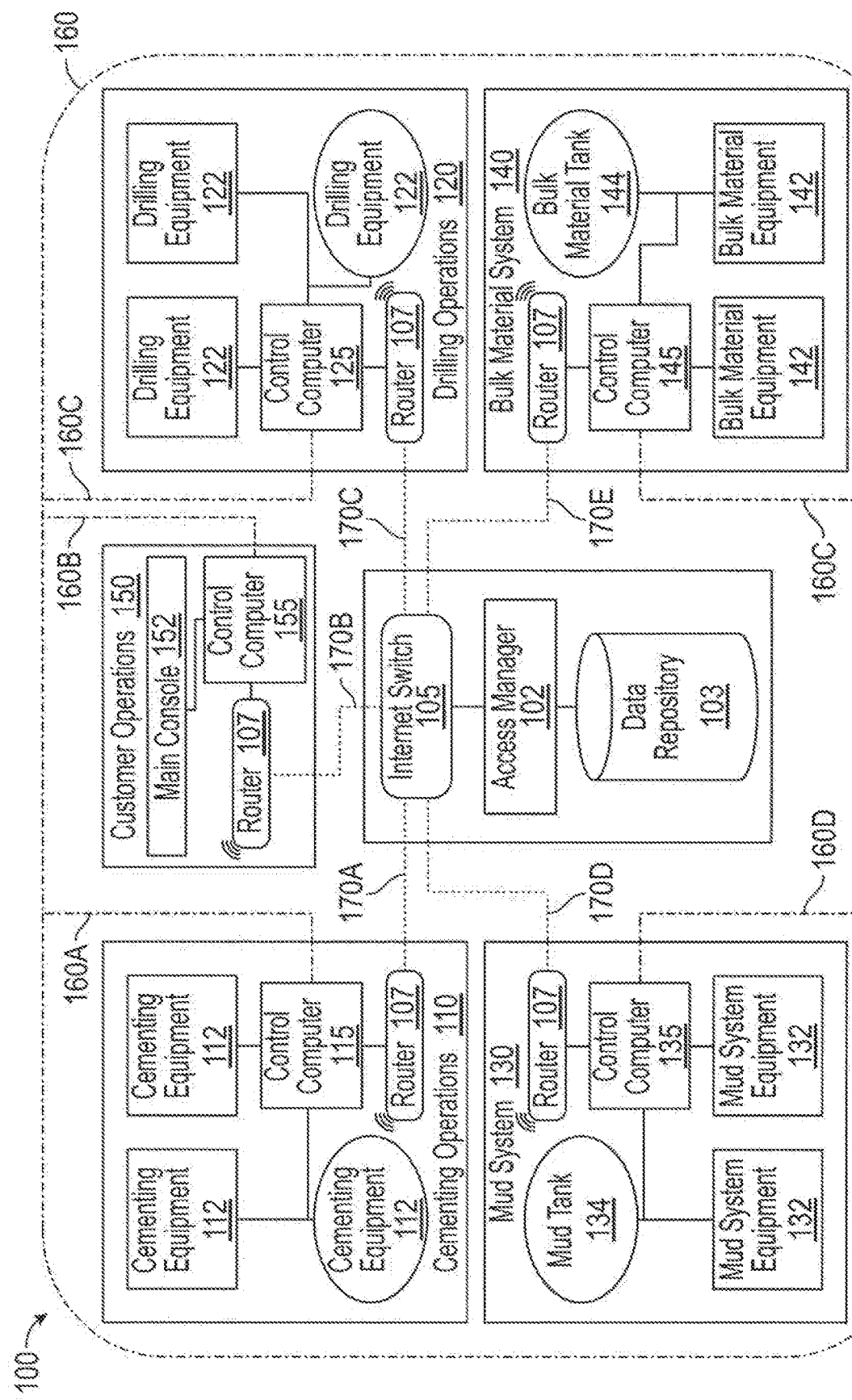
FIG. 1 is a diagram of a multi-location virtual collaboration and monitoring system for one or more sub-sites at a hydrocarbon recovery, exploration, operation, or services environment, according to one or more aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in term and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to on-site collaboration at a hydrocarbon recovery, exploration, operation, or services environment and, more particularly, to multi-location virtual collaboration, monitoring, and data sharing, including user control of data sharing, between sub-sites in a hydrocarbon recovery, exploration, operation, or services environment.

Illustrative embodiments of the present disclosure are described in detail herein. In the interest of clarity, not all features of an actual implementation are described in this specification. It will, of course, be appreciated that in the development of any such actual embodiment, numerous implementation-specific decisions must be made to achieve developers' specific goals, such as compliance with system-related and business-related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Throughout this disclosure, a reference numeral followed by an alphabetical character refers to a specific instance of an element and the reference numeral alone refers to the element generically or collectively. Thus, as an example (not shown in the drawings), widget "1a" refers to an instance of a widget class and widget "1n" refers to an nth instance of a widget class where "n" represent any number of widgets, which may be referred to collectively as widgets "1" and any one of which may be referred to generically as a widget "1". In the figures and the description, like numerals are intended to represent like elements.

Disclosed herein is a well site collaboration system comprising a first sub-site comprising a first networking system and a first one or more audio-visual communication devices; a second sub-site comprising a second networking system, a second one or more audio-visual communication devices, and one or more well site equipment; and an access manager comprising a third networking system. At least one of the first one or more audio-visual communication device may produce a first one or more datum and pass the first one or more datum to the first networking system. The first networking system may provide the first one or more datum to the third networking system and the third networking system may provide a second one or more datum to the second networking system. The second networking system may provide the second one or more datum to at least one of the second one or more audio-visual communication devices. The second one or more audio-visual communication devices may produce a first one or more notifications based, at least in part, on the second one or more datum, and one or more operations of the one or more well site equipment may be modified based, at least in part, on the one or more notifications.

In one or more embodiments, the one or more well site equipment of the well site collaboration system may comprise one or more of a drilling equipment, a bulk material system, a mud system, a cementer, and a customer equipment. In one or more embodiments, the access manager may require a security authentication prior to at least one of receiving the first one or more datum from the first networking system and providing the second on or more datum to the second networking system. In one or more embodiments, the second one or more datum may be the same as the first one or more datum. In one or more embodiments, the second one or more datum may correspond to the first one or more datum.

In one or more embodiments, the well site collaboration system may further comprise a first control computer at the first sub-site and a second control computer at the second sub-site, wherein the first control computer receives the first one or more datum from the at least one of the first one or more audio-visual communication devices and produces a third one or more datum, wherein the second control computer receives the third one or more datum and provides the third one or more datum to at least one of the second one or more audio-visual communication devices, wherein at least one of the second one or more audio-visual communication devices produces a second one or more notifications based, at least in part, on the third one or more datum, and wherein one or more operations of the one or more well site equipment is modified based, at least in part on the second one or more notifications. In one or more embodiments, the access manager may further comprise a data repository, wherein the first one or more datum is stored in the data repository, and wherein the second one or are datum is provided from the data repository.

In one or more embodiments at least one of the first on or more datum may be one or more real-time datum and the second one or more real datum may be one or more real-time datum. In one or more embodiments, at least one of the first one or more datum and the second one or more datum may comprise one or more of a real-time audio communication and a real-time video communication. In one or more embodiments, the one or more notifications may be produced in at least one of one or more augmented reality environments and one or more of virtual reality environments.

In one of more embodiments, at least one of the first one or more audio-visual communication devices and second one or more audio-visual communication devices may be at least one of a wearable device and a portable device. In one of more embodiments, producing the first one or ore notifications based, at least in part, on the second one or more datum may be configurable.

Disclosed herein is a method for collaborating at a well site comprising producing a first one or more datum using a first audio-visual communication device; transmitting the first one or more datum to an access manager; storing the first one or more datum in a data repository, wherein the data repository is coupled to the access manager; transmitting a second one or more datum from the access manager to a second audio-visual communication device, wherein the second one or more datum corresponds to the first one or more datum; producing one or more notifications using the second audio-visual communication device based, at least in part, on the second one or more datum; and modifying one or more sub-site operations based, at least in part, on the one or more notifications.

In one or more embodiments, the first audio-visual communication device may be at a first sub-site and the second audiovisual communication device may be at a second sub-site. In one or more embodiments, producing one or more notifications using the second audio-visual communication device based, at least in part, on the second one or more datum may be configurable based on one or more user settings. In one or more embodiments, at least one of the first one or more datum and the second one or more datum may comprise one or more of a real-time audio communication and a real-time video communication. In one or more embodiments, at least one of the first one or more datum and the second one or more datum may be one or more real-time datum.

Disclosed herein is a method of collaborating at a well site comprising producing a first one or more datum using a first audio-visual communication device; transmitting the first one or more datum to a first control computer; transmitting the first one or more datum from the first control computer to a second control computer; transmitting the first one or more datum from the second control computer to a second audio-visual communication device; providing a first one or more notifications using the second audio-visual communication device based, at least in part, on the first one or more datum; and modifying one or more operations based, at least in part, on the first one or more notifications.

In one or more embodiments, this method may further comprise producing a second one or more datum using the second audiovisual communication device; transmitting the second one or more datum to the second control computer; transmitting the second one or more datum from the second control computer to the first control computer; transmitting the second one or more datum from the first control computer to the first audio-visual communication device; and providing a second one or more notifications using the first audio-visual communication device based, at least in part, on the second one or more datum. In one or more embodiments, at least one of transmitting the first one or more datum from the first control computer to the second control computer and transmitting the second one or more datum from the second control computer to the first control computer may further comprise authorizing transmission based, at least in part, on one or more security settings.

Smart technology, including collaboration software, maw allow on-site experts access to data, including real-time data, to enable collaboration with multiple on-site coworkers during job execution. Smart technology may further enable one or more of enhanced collaboration for improved operations, more predictable well bore and production systems, cross-operations visibility, and private communication and data sharing between personnel on-site.

Disclosed herein are methods and systems for facilitating the seamless and real-time data collection, processing, and distribution using collaboration devices at a hydrocarbon recovery, exploration, operation, or services environment. Specifically, collaboration devices may comprise audio-visual commination devices capable of displaying augmented reality and virtual reality environments. Even more specifically, audio-visual communication devices may be wearable devices, and may comprise devices that can be worn on a human head in a manner similar to eyeglasses. Augmented reality may be a live view of a physical, real-world environment whose elements are augmented by computer-generated sensory input, such as sound, video, graphics, or global positioning system (GPS) data. In contrast, virtual reality may be a completely fabricated environment comprising computer-generated sensory inputs including without limitation sound, video, graphic and haptic or vibrational inputs. Images in virtual reality (VR) environment and augmented reality (AR) environments may comprise data corresponding to one or more pieces of equipment, video or audio from monitoring devices at a sub-site, or any other suitable source. Monitoring devices may comprise specialized equipment for monitoring sub-site equipment, other audio-visual communication devices, and any other device for data acquisition. Audio-visual communication devices may be coupled to a control computer or a networking system for access to various data. Data may be provided in a variety of formats including without limitation communications, alarms, warnings, video, documents, maintenance information, diagnostics, and help guides. In one or more embodiments, data provided may be real-time. Although this disclosure describes audio-visual devices 124, any wearable device may be used, including eyewear, helmets, implantable devices, wristbands, and smartwatches. The present disclosure contemplates audio-visual devices 124 that are not wearable, but are portable, such that user might move and without a sub-site with an audio-visual device that is not necessarily wearable due to one or more of size, weight, and other constraints.

Also disclosed herein are methods and systems providing a centralized system for sharing and exchanging audio, video, and data between two or more sub-sites at a location, for example, a hydrocarbon recovery, exploration, operation, or services environment. Sub-sites may include without limitation customer sites, operations sites including without limitation cementing and drilling sites, and system sites including without limitation mud and bulk material systems. An access manager the center of the system may receive data from one or more sub-sites and provide controlled access to said data. Controlled access may be fixed or may be configurable in real-time. The access manager may comprise a central data repository to store data received from sub-sites and to provide data to sub-sites. In one or more embodiments, access manager may provide raw sub-site data received from a first sub-site to a second sub-site. In one or more embodiments, access manager may be configured to receive data from a first sub-site and transmit data corresponding to the data from the first sub-site to a second sub-site. For example, data from the first sub-site may be indicative of a dangerous condition and the access manager may transmit a warning message to users at a second sub-site based on receipt of the data indicative of the dangerous condition. Accordingly, the access manager may facilitate collaboration between two or more sub-sites by distributing data between sub-sites.

Sub-sites may comprise smart technologies including without limitation audio-visual communication devices. As noted above, audio-visual communications devices may comprise personal wearable devices for hands-free viewing and collaboration of shared data. Other smart technologies and devices may allow data sharing, viewing, and collaboration between on-site personnel equipped with audio-visual communication devices. The multi-location virtual collaboration and monitoring system may be integrated with well site drilling operations a with various service providers, operators, and customers.

In one or more embodiments, the access manager may serve as a security gateway. The access manager may enable on-site personnel to select and customize data sharing and collaboration access and participation between sub-sites, thereby maintaining the security and confidentiality of data. In one or more embodiments, an individual may be designated as the owner, or manager, of a particular sub-site and may be responsible for assigning security and privilege levels for data, information, documents and other content associated with the sub-site. In one or more embodiments, the owner may have authorization to restrict and grant physical access to the sub-site. In one or more embodiments, the owner may have authorization to restrict and grant electronic access to the sub-site, including without limitation data and information, documents, files, and other content associated with the sub-site. Access privileges may be assigned based, at least in part, on an individuals' employer, title, role, function, and other factors. Example access privileges include without limitation permitting certain users to physically and electronically access a sub-site, permitting certain users to access all data associated with a sub-site, permitting certain users to access certain data associated with a sub-site, permitting certain data to be copied and shared internally within a particular company, permitting a remote site and users at said remote site to electronically access all sub-site data, permitting a remote site and users at said remote site to electronically access certain sub-site data, permitting a remote site and certain users at said remote site to electronically access certain sub-site data, permitting remote site and certain users at said remote site to copy and share all sub-site data, and permitting remote site and certain users at said remote site to copy and share certain sub -site data.

FIG. 1 is a diagram of a well site virtual collaboration system 100 for one or more sub-sites in a hydrocarbon recovery, exploration, operation, or services environment, according to one or more aspects of the present disclosure. The environment may comprise one or more operations sub-sites including without limitation cementing operations 110, customer operations 150, drilling operations 120, and any other type of operations or combination thereof. The environment may further comprise one or more system sub-sites including without limitation a mud system 130, a bulk material storage and handling system 140, and any other system, device, or combination thereof. In one or more embodiments, sub-sites 110, 120, 130, 140, and 150 may be coupled by communications channel 170 to access manager 102.

In one or more embodiments, an operations sub-site or systems sub-site may communicate with any other operation or system via communication loop 160, bypassing access manager 102. For example, cementing operation 110 with control computer 115 may be coupled to communication loop 160 via communication channel 160A, a customer operation 150 with console computer 155 may be coupled to communications loop 160 via communication channel 160B, a mud system and returns 130 with control computer 135 may be coupled to the communication loop 160 via communication channel 160D, a bulk material system 140 with control computer 145 may be coupled to communications loop 160 via communications channel 160E, and a drilling operation 120 with controller 125 may be coupled to communications loop 160 via communications channel 160C. Accordingly, any control computer may communicate with any other control computer or console computer via communications loop 160. Communication loop 160 may couple control computers 115, 125, 135, 145, 155 directly or indirectly via one or more wired and wireless technologies. One of ordinary skill in the art will recognize that communication channel loop 160 may comprise one or more communication loops and channels. Communication loop 160 may be bi-directional or unidirectional.

In one or more embodiments, the well site collaboration system 100 may comprise an access manager 102. Access manager 102 may be coupled to a central data repository 103 for data storage. Access manager 102 may comprise one or more data or information handling systems. Central data repository 103 may comprise a database. Communications channel 170 may be coupled to access manager 102 directly or indirectly via one or more wired and wireless technologies.

In one or more embodiments, at least one of communication loop 160 and communications channel 170 may comprise a secure communications network. In other embodiments, at least one of communication loop 160 and communications channel 170 may comprise a non-secure communications network. Communication loop 160 and communications channel 170 may comprise real-time data and archived data including without limitation any type of communications and communications data such as audio data, video data, any other communications data, and any combination thereof.

In in one or more embodiments, access manager 102 may provide secure access to data stored in data repository 103 and may enable communication, for example, an audio communication, a video communication or both, between sub-sites 110, 120, 130, 140, 150. Access manager 102 may further enable security settings, including without limitation user validation via user ID and password, authentication of participants in certain audio and video communications, and enforcement of data permissions and privileges. In one or more embodiments, security privileges and access may be defined such that certain data may be only made available to or accessible from certain sub-sites or by certain sub-site users or personnel. In one or more embodiments, access manager 102 may be configured to limit access to only users on-site. In one or more embodiments, access manager 102 may enable access from users on- and off-site to enable remote monitoring and collaboration. A user may comprise a person or individual, a subject matter expert, an operator, personnel, a system, any other type of user, and any combination thereof. Access manager 102 may be configured to distribute data from data repository 103 to users throughout the well site and may be further configured to filter data as it is received at the access manager, as it is distributed from the access manager, or both. Access manager 102 may comprise a combination of commercially available hardware, proprietary hardware, commercially available software, and proprietary software.

In one or more embodiments, control computers 115, 125, 135, 145, 155 may be coupled via communications channel 160, enabling transfer of data between sub-sites. Control computers 115, 125, 135, 145, 155 may enable one or more security settings. For example, when bypassing access manager 102, it may be necessary for the control computers to ensure data is transferred only between authorized users and devices. Accordingly, control computers 115, 125, 135, 145, 155 may enable security settings, including without limitation, user validation via user ID and password, authentication of participants in certain audio and video communications, and enforcement of data permissions and privileges. Control computers 115, 125, 135, 145, 155 may enforce security privileges and access may be defined such that certain data may be only made available to or accessible from certain sub-sites or by certain sub-site users or personnel. Control computers 115, 125, 135, 145, 155 may comprise a combination of commercially available hardware, proprietary hardware, commercially available software, and proprietary software.

As shown in FIG. 1, cementing operations 110 may comprise cementing equipment 112 for mixing dry bulk materials, including without limitation cement, with liquid additives, such as water and surfactants, to create a cement slurry. Additionally, cementing equipment 112 may pump cement slurry under high pressure down the well bore to cement steel tubular products in the well bore. In one or more embodiments, tubular products may include without limitation casing. Control computer 115 may monitor and control cementing operations and may record and distribute data including without limitation data related to one or more of pressures, flow rates, densities, pressures, volumes, any other relevant data, and any combination thereof.

Drilling operations 120 may further comprise a control computer 125 and one or more types of drilling equipment 122. From control computer 125, a user may monitor and control various drilling equipment 122 including without limitation draw works, top drive, rotary table, power slips, other relevant equipment, and any combination thereof. Control computer 125 may record and distribute drilling data, statuses, any other relevant drilling data, and any combination thereof.

Mud system 130 may comprise control computer 135 and mixing equipment 132 for mixing, storing, and using drilling muds for drilling operations including without limitation one or more mud tanks 134, as well as systems and equipment for mud returns. Control computer 135 may monitor and control mixing, storing, and use of drilling muds. Controlling computer 135 may record and distribute data including without limitation data related to one or more of pressures, flow rates, tank volumes, any other relevant mud system data, and any combination thereof.

Bulk material system 140 may comprise a control computer 145 and bulk material equipment 142 and hulk material tanks 144. In one or more embodiments, bulk material tanks 144 may comprise large pressurized tanks, During cementing operations, dry material may be conveyed to cementing operations 110 by bulk material equipment 142. In one or more embodiments, dry material may be conveyed pneumatically in pipes (not shown). Control computer 145 may monitor and control at least storage volumes and material conveyance. Control computer 145 may record and distribute data including without limitation data related to one or more of pressures, flow rates, tank volumes, any other relevant storage data, and any combination thereof.

Customer operations 150 may comprise a main console 152 to enable a customer to monitor operations at the well site. Control computer 155 and the main console 152 may enable or provide observation of any one or more operations and systems at the site by at least, for example, enabling or providing review of data recorded and distributed from control computers 115, 125, 135, 145 and data stored in data repository 103. Customer operations 150 may further enable or provide communication from the main console 152 to one or more users or personnel at one or more sub-sites to improve operations, enable more predictable well bore and production systems, and provide cross-operations visibility.

Figure 2:
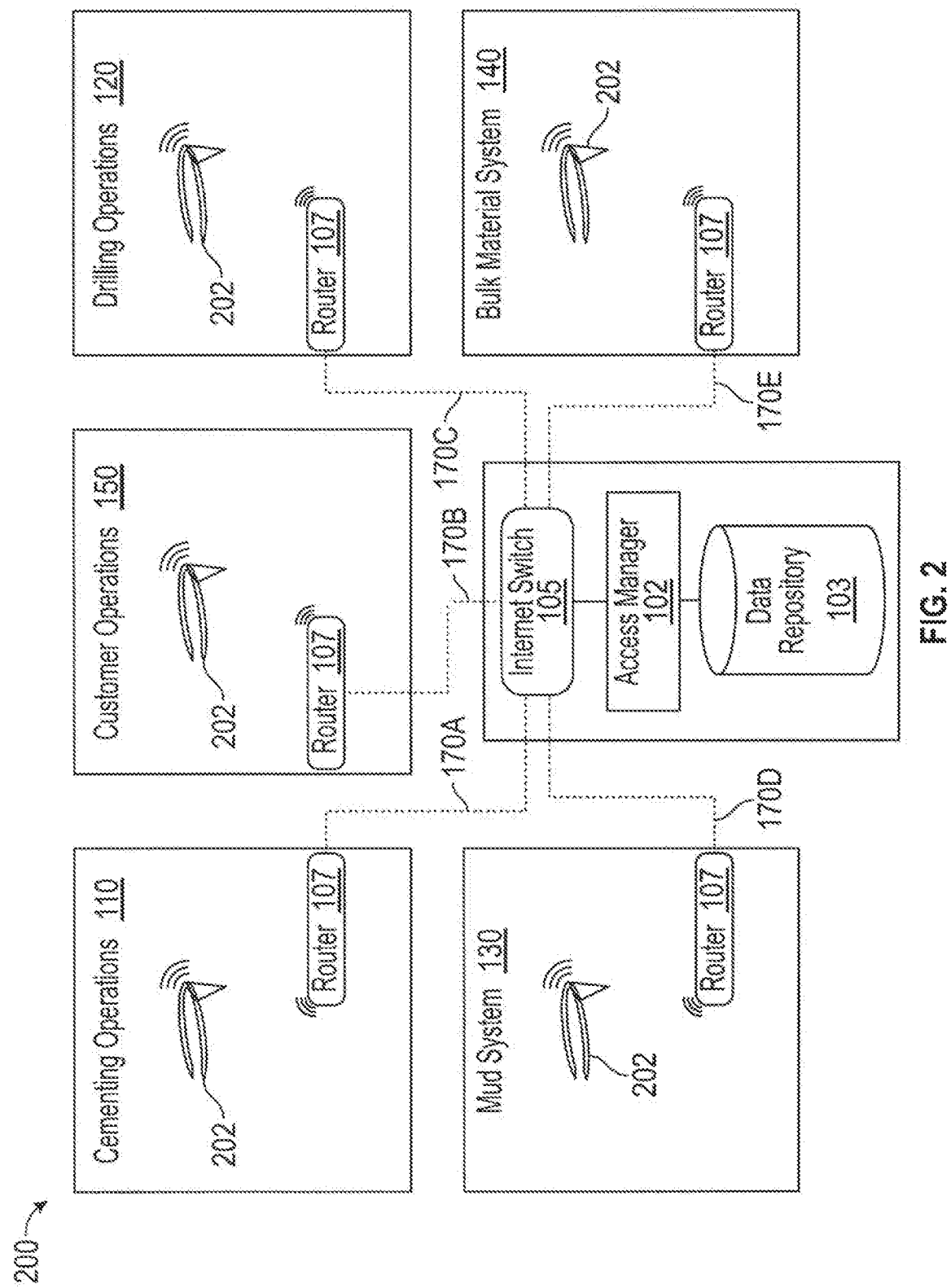
FIG. 2 is a diagram of smart wearable devices and data transmission between sub-sites in a well site virtual collaboration system for a hydrocarbon recovery, exploration, operation, services environment, according to one or more aspects of the present disclosure.

FIG. 2 is a diagram of smart wearable devices and data transmission between sub-sites in a well site virtual collaboration system for a hydrocarbon recovery, exploration, operation, or services environment, according to one or more aspects of the present disclosure. As described in FIG. 1, the environment may comprise one or more operations sub-sites including without limitation cementing operations 110, customer operations 150, drilling operations 120, and one or more system sub-sites including without limitation mud system 130, bulk material and handling systems 140, any other systems and devices, and any combination thereof.

As noted above, sub-sites 110, 120, 130, 140, 150 may be coupled by communications channel 170 to access manager 102. Likewise, sub sites 110, 120, 130, 140, 150 may be coupled together by communications loop 160. In one or more embodiments, routers 107 may be coupled to an internet switch 105. Internet switch 105 may be coupled to the access manager 102. At each sub-site, users may use audio-visual communication devices, including without limitation wearable smart wearable devices 202. In one or more embodiments, smart wearable device 202 may be coupled to router 107. In one or more embodiments, smart wearable device 202 may be coupled to control computers 115, 125, 135, 145, 155 and control computers 115, 125, 135, 145, 155 may be coupled to router 107 (not shown).

As noted herein, coupling between routers 107, internet switch 105, access manager 102, wearable devices 202, control computers 115, 125, 135, 145, 155, and any other electronic equipment may comprise any networking equipment known to one of ordinary skill in the art and may use one or more communication methods and protocols. Networking may comprise any network topology, including without limitation wired and wireless solutions, direct and indirect coupling between nodes, local area networks (LANs), wide area networks (WANs), and low power WANs (LPWANs). Wireless communication methods may include without limitation wireless networks, infrared communication, microwave communication, radio, and satellite transmission. Additionally, wireless communication may occur through various data communication specifications including without limitation Bluetooth, long-term evolution (LTE), Worldwide Interoperability for Microwave Access (WiMax), and Zigbee. Such coupling may occur also through wired communication media including without limitation controller area network (CAN) buses, coaxial cable, fiber optic cable, and twisted pair cable. Communication between devices may occur using one or more communication protocols including without limitation Open Platform Communications Unified Architecture (OPC UA), Z-Wave, and user data protocol (UDP) and transmission control protocol (TCP) sockets. Certain standards, specifications, protocols, and architectures may be suitable for defining real-time data communication within the remote monitoring and control system including, without limitation Ethernet for Control Automation Technology (EtherCAT), EtherNet/IP, Process Field Net (PROFINET), Ethernet Powerlink, Sercos III, CC-Link, and Modbus.

Audio-visual communication devices 202 may comprise optical devices or other personal devices, smart or otherwise, that may be worn or transported by a user on- and off-site. In one or more embodiments, audio-visual communication devices 202 may provide real-time notifications and communications including without limitation audio communications and visual communications. In one or more embodiments, audio-visual communication devices 202 may enable hands-free viewing of data from one or more sub-sites including without limitation data related to one or more of pressures, flow rates, volumes, levels, weights, temperatures, viscosities conductivities, pH levels, and any other related data and information. Audio-visual communication devices 202 may facilitate display of data in one or more virtual reality (VR) environments, in one or more augmented reality (AR) environments or in a combination of one or more AR and VR environments. Audio-visual communication devices, like smart phones, may run one or more applications and may perform a variety of functions based on said applications.

In one or more embodiments, one or more audio-visual communication devices 202 may allow for collaboration between sub-sites. For example, certain applications may provide remote monitoring and collaboration between users at one or more sub-sites by sharing audio and video data to support subject matter expert assistance and mentoring, troubleshooting, and quality assurance. Augmented reality applications may augment a user's experience by generating graphics that are displayed to a user without completely occluding the user's view of the environment. Unlike prior implementations in which a user may only work at a fixed workstation, AR applications may enable users at a sub-site to move around the site while continuing to access site data. Virtual reality, VR, applications may enable a user, who may be sitting or standing still, to immerse him- or herself in sub-site data regardless of wherever the user is physically located. VR applications may also be beneficial in customer operations to enable an on-site user, such as a visiting customer, to consume on-site data. This may be particularly valuable if, for example, the user is a subject matter expert who might be located off-site but is able to use sub-site data to offer subject matter expertise to one or more users on-site. In one or more embodiments, users may interact with systems and operations using one or more of gestures, motions, button presses, selections, and voice commands.

Unlike other industries, it may be particularly beneficial to users working on- and off-site to have customizable or configurable access to data, including without limitation configurable display of data in one or more AR environments and in one or more VR environments. For example, a user at cementing operations may configure display of certain cementing data including without limitation data related to one or more of cement pressures, flow rates, density, pressure, volumes, and other relevant data, while a user at the bulk material system sub-site may configure display of certain bulk material data including without limitation data related to one or more of bulk material pressures, flow rates, and tank volumes on his or her wearable device. In another example, a user may wish to view certain cementing data at one time, but wish to change display parameters to show bulk material data at a subsequent time. In yet another example, a user may wish to view some cementing data while simultaneously viewing some bulk material data to ensure sufficient bulk material is available for cementing operations, and then may wish to communicate with personnel at both cementing operations and bulk material systems sub-sites to improve sur sites performance and coordination. In one or more embodiments, a user may choose to receive all on-site data and filter the on-site data so only some subset of all on-site data is displayed. In one or more embodiments, a user may choose to receive only a subset of all on-site data and display all or a subset of received data.

In one or more embodiments, users may make real-time adjustments or modifications to AR and VR systems. For example, a user may configure ad audio-visual communication device to enable certain communications and disable other communications while traveling from one sub-site to another sub-site. In another example, a user may choose parameters associated with a smart device, wearable or otherwise, to limit display to only those values that are likely to change based, at least in part, on the type of operations on-going on-site to simplify sub-site monitoring.

In one or more embodiments, a user or organization may configure a smart device, wearable or otherwise, to provide notifications to users on- and off-site based, at least in part, certain configurable parameters and sub-site data. Configurable notifications may enable users to receive notifications that prompt action to avoid undesirable consequences, even when the user may be away from workstation. Further, the multi-location virtual collaboration and monitoring system enables users distributed throughout a work site to communicate with one another to avoid undesirable results using audio-visual communication devices regardless of where those users are located.

As described herein, control computers 115, 125, 135, 145, 155 and access manager 102 (generally, computers) may comprise any suitable machine or network of machines capable of communicating with other network equipped devices including without limitation on-site equipment, audio-visual devices, control devices, network devices, storage devices, and other resources. Computers may comprise a processor or central processing unit configured for executing instructions, program instructions, process data, or any combination thereof. The processor may be configured to interpret and execute program instructions, software, or other data retrieved and stored in memory, including without limitation read-only memory (ROM), random access memory (RAM), solid state memory, or disk-based memory.

Modifications, additions, or omissions may be made to computers without departing from the scope of the present disclosure. Any suitable configurations of components may be used. For example, components of computers may be implemented either as physical or logical components. Furthermore, in one or more embodiments, functionality associated with computers may be implemented in special purpose circuits or components. In one more embodiments, functionality associated with components of computers may be implemented in configurable general-purpose circuit or components, such as configured computer program instructions.

In any embodiment, computers may include a non-transitory computer readable medium that stores one or more instructions where the one or more instructions when executed cause the processor to perform certain actions. As used herein, a computer may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. It should be understood that various changes, substitutions and alterations can be made herein without departing from the spirit and scope of the disclosure as defined by the claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

What is claimed is:

1. A well site collaboration system comprising:
a first sub-site comprising a first networking system, a first router, and a first one or more audio-visual communication devices, wherein the first router is communicatively couple to the first one or more audio-visual communication devices;
a second sub-site comprising a second networking system, a second router, a second one or more audio-visual communication devices, wherein the second router is communicatively couple to the second one or more audio-visual communication devices, and one or more well site equipment; and
an access manager comprising a third networking system,
wherein the first sub-site is communicatively coupled to the second sub-site through a communication loop, bypassing the access manager, wherein the first router and the second router are coupled to the access manager through an internet switch,
wherein at least one of the first one or more audio-visual communication devices produces a first one or more datum,
wherein the first networking system receives the first one or more datum from the at least one of the first one or more audio-visual communication devices,
wherein the third networking system receives the first one or more datum from the first networking system and provides a second one or more datum to the second networking system,
wherein at least one of the second one or more audio-visual communication devices receives the second one or more datum from the second networking system and produces a first one or more notifications based, at least in part, on the second one or more datum, and
wherein one or more operations of the one or more well site equipment is modified based, at least in part, on the first one or more notifications.

2. The system of claim 1, wherein the one or more well site equipment further comprises one or more of a drilling equipment, a bulk material system, a mud system, a cementer, and a customer equipment.

3. The system of claim 1, wherein the access manager requires a security authentication prior to at least one of receiving the first one or more datum from the first networking system and providing the second one or more datum to the second networking system.

4. The system of claim 1, wherein the second one or more datum is the same as the first one or more datum.

5. The system of claim 1, wherein the second one or more datum corresponds to the first one or more datum.

6. The system of claim 1, wherein the first sub-site further comprises a first control computer and the second sub-site further comprises a second control computer,
wherein the first control computer receives the first one or more datum from the at least one of the first one or more audio-visual communication devices and produces a third one or more datum,
wherein the second control computer receives the third one or more datum and provides the third one or more datum to at least one of the second one or more audio-visual communication devices
wherein the second one or more audio-visual communication devices produces a second one or more notifications based, at least in part, on the third one or more datum, and
wherein one or more operations of the one or more well site equipment is modified based, at least in part, on the second one or more notifications.

7. The system of claim 1, wherein the access manager further comprises a data repository, wherein the first one or more datum is stored in the data repository, and wherein the second one or more datum is provided from the data repository.

8. The system of claim 1, wherein the first one or more datum is one or more real-time datum and the second one or more real datum is one or more real-time datum.

9. The system of claim 1, wherein at least one of the first one or more datum and the second one or more datum comprises one or more of a real-time audio communication and a real-time video communication.

10. The system of claim 1, wherein the first one or more notifications is produced in at least one of one or more augmented reality environments and one or more of virtual reality environments.

11. The system of claim 1, wherein at least one of the first one or more audio-visual communication devices and the second one or more audio-visual communication devices is at least one of a wearable device and a portable device.

12. The system of claim 1, wherein producing the first one or more notifications based, at least in part, on the second one or more datum is configurable.

13. A method for collaborating at a well site comprising:
producing a first one or more datum using a first audio-visual communication device communicatively coupled to a first router;
transmitting the first one or more datum to an access manager;
storing the first one or more datum in a data repository, wherein the data repository is coupled to the access manager;
transmitting a second one or more datum from the access manager to a second audio-visual communication device, communicatively coupled to a second router, wherein the first router and the second router are coupled to the access manager through an internet switch, wherein the second one or more datum corresponds to the first one or more datum;
producing one or more notifications using the second audio-visual communication device based, at least in part, on the second one or more datum; and
modifying one or more sub-site operations based, at least in part, on the one or more notifications.

14. The method of claim 13, wherein the first audio-visual communication device is at a first sub-site and the second audio-visual communication device is at a second sub-site.

15. The method of claim 13, wherein producing one or more notifications using the second audio-visual communication device based, at least in part, on the second one or more datum is configurable based on one or more user settings.

16. The method of claim 13, wherein at least one of the first one or more datum and the second one or more datum comprises one or more of a real-time audio communication and a real-time video communication.

17. The method of claim 13, wherein at least one of the first one or more datum and the second one or more datum is one or more real-time datum.

18. A method of collaborating at a well site comprising:
producing a first one or more datum using a first audio-visual communication device;
transmitting the first one or more datum to a first control computer communicatively coupled to a first router;
transmitting the first one or more datum from the first control computer to a second control computer communicatively coupled to a second router, wherein the first control computer is communicatively coupled to the second control computer through a communication loop, bypassing an access manager operable to store the first one or more datum;
transmitting the first one or more datum from the second control computer to a second audio-visual communication device;
providing a first one or more notifications using the second audio-visual communication device based, at least in part, on the first one or more datum; and
modifying one or more operations based, at least in part, on the first one or more notifications.

19. The method of claim 18, further comprising:
producing a second one or more datum using the second audio-visual communication device;
transmitting the second one or more datum to the second control computer
transmitting the second one or more datum from the second control computer to the first control computer;
transmitting the second one or more datum from the first control computer to the first audio-visual communication device;
providing a second one or more notifications using the first audio-visual communication device based, at least in part, on the second one or more datum.

20. The method of claim 19, wherein at least one of transmitting the first one or more datum from the first control computer to the second control computer and transmitting the second one or more datum from the second control computer to the first control computer further comprises authorizing transmission based, at least in part, on one or more security settings.

* * * * *